(12) United States Patent
Borgeat (10) Patent No.: US 7,086,195 B2
(45) Date of Patent: Aug. 8, 2006

(54) FLY FISHING ROD HAVING A DETACHABLE REEL SEAT AND WAIST HOLDER THEREFORE

(76) Inventor: Louis Borgeat, 817, Bellevue, Sainte-Foy, Québec (CA) G1V 2R6

( * ) Notice: Subject to any disclaimer, the term of this patent is extended or adjusted under 35 U.S.C. 154(b) by 0 days.

(21) Appl. No.: 10/660,529

(22) Filed: Sep. 12, 2003

(65) Prior Publication Data

US 2004/0093786 A1    May 20, 2004

Related U.S. Application Data

(63) Continuation-in-part of application No. 09/882,092, filed on Jun. 18, 2001, now abandoned.

(51) Int. Cl.
*A01K 87/02* (2006.01)
*A01K 87/06* (2006.01)

(52) U.S. Cl. .................... 43/18.1 CT; 43/22

(58) Field of Classification Search ............ 43/18.1 R, 43/18.1 CT, 22, 23
See application file for complete search history.

(56) References Cited

U.S. PATENT DOCUMENTS

| | | | | |
|---|---|---|---|---|
| 303,474 A | * | 8/1884 | Webb | 43/18.1 R |
| 389,335 A | * | 9/1888 | Spear | 43/18.1 R |
| 394,032 A | * | 12/1888 | Treadway | 43/23 |
| 481,462 A | * | 8/1892 | Benson | 43/18.1 R |
| 828,557 A | * | 8/1906 | Levison | 43/23 |
| 832,307 A | * | 10/1906 | Flegel | 43/22 |
| 951,731 A | * | 3/1910 | Haskell | 43/22 |
| 998,318 A | * | 7/1911 | Young | 43/18.1 R |
| 1,001,326 A | * | 8/1911 | Upton | 43/23 |
| 1,013,333 A | * | 1/1912 | Tredwelll | 43/23 |
| 1,337,378 A | * | 4/1920 | Winskas | 43/18.1 CT |
| 1,350,637 A | * | 8/1920 | Beaty | 43/22 |
| 1,351,473 A | * | 8/1920 | Forster | 43/18.1 R |
| 1,735,026 A | * | 11/1929 | Welch | 43/23 |

(Continued)

FOREIGN PATENT DOCUMENTS

DE   3903334 A1 *  8/1990   ............ 43/22

(Continued)

OTHER PUBLICATIONS

Marshall, Mel, How to Make Your Own Fishing Rods, 1978, pp. 93-97, 107-111, 134-137, Outdoor Life, New York.

(Continued)

*Primary Examiner*—Darren W. Ark
(74) *Attorney, Agent, or Firm*—Ogilvy Renault, LLP (57) ABSTRACT

The present invention concerns a fly fishing rod with a detachable reel and reel seat assembly. The fly fishing rod of the present invention comprises a rod shaft and a handgrip disposed at an inner end rod shaft, and is adapted for removably connecting a reel to the handgrip by means of a hollow cylindrical reel seat. The rod shaft of the fly fishing rod has a portion extending past the handgrip so as to mount the reel thereon through the reel seat, rearwardly of the handgrip. A sleeve like adapter is engaged over the shaft portion and comprises a locking groove. The reel seat is slidable over the adapter and has a stud portion arranged to be engaged in the locking groove for connecting the reel seat to the handgrip, and to be removed thereon by disengaging the stud portion from the locking groove, thereby making it possible to dispose the reel seat away from the fly fishing rod. The disclosure of the present invention also relates to a reel and reel seat assembly holding device and a waist holder for the holding device.

13 Claims, 5 Drawing Sheets

U.S. PATENT DOCUMENTS

| | | | | |
|---|---|---|---|---|
| 1,918,583 | A * | 7/1933 | Bear | 403/202 |
| 2,005,081 | A * | 6/1935 | Gephart | 43/23 |
| 2,018,923 | A * | 10/1935 | Potter | 43/23 |
| 2,088,132 | A * | 7/1937 | Domecq | 43/23 |
| 2,276,524 | A * | 3/1942 | Taylor | 43/18.1 R |
| 2,421,240 | A * | 5/1947 | Elwyn | 43/23 |
| 2,456,681 | A * | 12/1948 | Culver | 43/22 |
| 2,559,934 | A * | 7/1951 | Briney | 43/18.1 R |
| 2,782,547 | A * | 2/1957 | McMullin | 43/22 |
| 2,793,458 | A * | 5/1957 | Stephens | 43/22 |
| 3,006,098 | A * | 10/1961 | Harke | 43/22 |
| 3,047,974 | A * | 8/1962 | Stephens | 43/22 |
| 3,123,931 | A * | 3/1964 | Stephens | 43/22 |
| 3,170,721 | A * | 2/1965 | Wells et al. | 43/18.1 CT |
| 3,175,321 | A * | 3/1965 | Stephens | 43/22 |
| 3,175,323 | A * | 3/1965 | Axelsson | 43/22 |
| 3,296,732 | A * | 1/1967 | Magnus | 43/23 |
| 3,426,466 | A * | 2/1969 | Shepherd | 43/22 |
| 3,443,335 | A * | 5/1969 | Guydos | 43/22 |
| 3,500,570 | A * | 3/1970 | Hubbard | 43/18.1 R |
| 3,556,365 | A | 1/1971 | Bull | |
| 3,564,752 | A * | 2/1971 | Catignani | 43/22 |
| 3,570,164 | A * | 3/1971 | Tozier | 43/18.1 R |
| 3,811,215 | A * | 5/1974 | Fleischer | 43/18.1 CT |
| 3,975,855 | A * | 8/1976 | McKeown | 43/23 |
| 4,051,617 | A * | 10/1977 | Dorph | 43/18.1 R |
| 4,067,133 | A * | 1/1978 | Livingston | 43/18.1 CT |
| 4,133,133 | A * | 1/1979 | Casset | 43/22 |
| 4,467,548 | A | 8/1984 | Tabor | |
| 4,541,197 | A * | 9/1985 | LeRoue | 43/18.1 R |
| 4,644,680 | A * | 2/1987 | Dawson | 43/18.1 R |
| 4,696,123 | A * | 9/1987 | Bailey, Jr. | 43/22 |
| 4,703,578 | A * | 11/1987 | Highby | 43/18.1 R |
| 4,738,046 | A * | 4/1988 | Fraylick et al. | 43/18.1 R |
| 4,800,668 | A * | 1/1989 | Burrough | 43/18.1 R |
| 4,815,228 | A * | 3/1989 | Abel | 43/22 |
| 4,860,484 | A * | 8/1989 | Green et al. | 43/22 |
| 4,860,485 | A * | 8/1989 | Rhoton et al. | 43/18.1 CT |
| 4,891,899 | A * | 1/1990 | Wulff | 43/22 |
| 4,916,848 | A | 4/1990 | Childre | |
| 5,175,952 | A | 1/1993 | Yamato | |
| 5,237,770 | A * | 8/1993 | Creek | 43/22 |
| 5,263,275 | A * | 11/1993 | Rumbaugh | 43/23 |
| 5,288,359 | A * | 2/1994 | Stobbie et al. | 43/23 |
| 5,369,904 | A * | 12/1994 | Vogts et al. | 43/18.1 R |
| 5,522,169 | A * | 6/1996 | Heller | 43/23 |
| 5,564,215 | A * | 10/1996 | Phelps | 43/22 |
| 5,697,184 | A * | 12/1997 | Heller | 43/23 |
| 5,974,722 | A * | 11/1999 | Kiser | 43/18.1 CT |
| 6,105,301 | A * | 8/2000 | Ohmura | 43/22 |
| 6,115,955 | A * | 9/2000 | Sledge | 43/23 |
| 6,629,382 | B1 * | 10/2003 | Irrgang et al. | 43/22 |
| 6,922,936 | B1 * | 8/2005 | Markley et al. | 43/18.1 CT |
| 6,931,781 | B1 * | 8/2005 | Markley et al. | 43/18.1 R |
| 2002/0189149 | A1 * | 12/2002 | Borgeat | 43/18.1 R |

FOREIGN PATENT DOCUMENTS

| | | | | |
|---|---|---|---|---|
| DE | 10239603 | B3 * | 1/2004 | |
| FR | 631144 | B1 * | 12/1927 | 43/18.1 R |
| FR | 86758 | | 2/1966 | |
| FR | 1536443 | | 7/1968 | |
| GB | 12281 | A1 * | 7/1893 | 43/18.1 R |
| GB | 2259636 | A * | 3/1993 | 43/23 |
| GB | 2264029 | A1 * | 8/1993 | |
| JP | 9-163901 | B1 * | 6/1997 | |
| JP | 10-4834 | B1 * | 1/1998 | |
| JP | 11-9150 | B1 * | 1/1999 | |
| JP | 2000-50769 | B1 * | 2/2000 | |
| JP | 2001-333668 | B1 * | 12/2001 | |
| JP | 02001333668 | | 12/2001 | |
| JP | 2002-119178 | B1 * | 4/2002 | |
| JP | 2002-171875 | B1 * | 6/2002 | |
| JP | 2003-230333 | B1 * | 8/2003 | |
| JP | 2003-289767 | B1 * | 10/2003 | |
| JP | 2003-319738 | B1 * | 11/2003 | |
| JP | 2004-208544 | B1 * | 7/2004 | |
| WO | WO-95/09529 | A1 * | 4/1995 | |

OTHER PUBLICATIONS

Pfeiffer, Boyd C, Tackle Care—The Tackle Maintenance Handbook, 1987, pp. 78, 79, Nick Lyons Books, New York.

* cited by examiner

FLY FISHING ROD HAVING A DETACHABLE REEL SEAT AND WAIST HOLDER THEREFORE

CROSS-REFERENCES

This application is a continuation-in-part of patent application Ser. No. 09/882,092 filed on Jun. 18, 2001 now abandonded.

FIELD OF THE INVENTION

The present invention relates to the field of fly-fishing and is particularly concerned with a fly fishing rod having a reel and reel seat assembly that is mounted in a removable manner on the fly fishing rod. The invention is also concerned with a reel and reel seat holder and a waist holder in which the reel and reel seat assembly is disposed after being removed from the fly fishing rod.

BACKGROUND OF THE ART

During most sport fishing activities such as fly casting, spin casting, bait casting and the like, an artificial lure or a live bait having a fishing line attached thereto is projected or cast into fish filled waters in hope that a fish will take the bait. It is often desirable to cast the bait far away from the fisherman since most fishes are quite easily scared away by human presence.

Typically, the energy which propels both the lure and the fishing line is stored and subsequently released by the fishing pole which conventionally consists of a thin elongated flexible rod. When the rod releases the potential energy contained therein, this energy is transformed into kinetic energy which is transmitted to the fishing lure and propels the latter over the water surface away from the fisherman.

During both bait and spin casting activities, the lure or bait being relatively heavy, this causes the fishing rod to flex as the fisherman from the back cast starts the forward cast, thereby storing energy in the rod. At the end of the forward cast, as the rod straightens out, the line is released and allowed to move freely across the water away from the fisherman.

Conversely, in fly casting the artificial lures or flies used are very light weight and not capable of causing the rod to flex. In fact, the lures are so light weight that the resistance due to air friction cannot be overcome unless the fly is attached to a heavier object. Hence, a fly fisherman is really casting the fly line rather than the fly itself. A great deal of efforts has thus been extended on designing fly lines and tailoring casting methods to efficiently propel the line through the air.

Parallel to the search for fly-casting efficiency, other efforts have been made to lighten the fishing rod and reel as much as possible for the fisherman. This search for overall lightness in the fishing gear handled by the fisherman stems from the fact that each cast made to propel the lure the right distance requires constant and always well-controlled muscular efforts.

First, with each cast, the fisherman's arm has to transmit to the rod the energy required to send the line the required distance. That means the fisherman must either make many false throws in sequence to allow the line to go progressively farther or pull back the part of the line that is already in the water in a single sharp movement and then recast in another movement right after it has been pulled back. This effort is required each time the fisherman wants to return the lure to the surface of the water. Therefore a fisherman who casts his line twice a minute during a fishing day lasting eight hours will end up making close to 1,000 casts, all of them different. Furthermore, for each cast, the fisherman must have precise and firm control of the rod movement, which has to move through a well-defined axis to get the required propulsion.

Through years of refinement, fly casters have learned to control the loop created in the line by the casting motion. It is well known that this loop is one of the most important parameters for fly casters to control. Thus, fly casters must make subtle movement adjustments to maintain the line loop as small as possible. This is, in part, accomplished by keeping the rod tip in a substantially vertical plane with respect to the ground. These subtle movement adjustments in a somewhat non-ergonomic position may quickly lead to muscle fatigue which, in turn, may deter the overall enjoyment of the fly fishing casting activity. Furthermore, as the infrequently solicited muscles of the hand, wrist and arm become tired, the efficiency of the casting stroke will be lessened.

Accordingly, it would be desirable to provide a fly fishing rod that is lighter in weight than conventional fishing rods so as to lessen the risk of muscle fatigue. The prior art has recognized this need and, hence, has notably proposed various types of fishing equipment made out of lightweight material. Regarding the construction of the rod itself, the use of lighter and lighter materials, for example, graphite and graphite composites, has allowed for significant improvements. The same trend holds for reels, which are being made with ever-lighter metal alloys and with simpler and simpler mechanisms. But progress in this latter area has become less and less a factor in the search for lightness; in the end, it has provided limited improvement since a great portion of the weight resides in the reel and associated reel seat. Nowadays the fishing rods are somehow ⅓ to ⅕ the weight of the total combination of their reel and reel seat assembly.

Also, some rod holders have been proposed in order to reduce the fisherman's efforts. But rod holders have heretofore been designed for general-purpose rods almost exclusively. Prior art rod holders have been utterly unamenable to use with a fly rod, instead being configured to accommodate general-purpose rod and reel.

However, the general-purpose rod and reel is proportioned differently from a fly rod. The reel mounted on a general purpose rod is usually located some distance from the end of the rod, farther up the rod, more towards the eyelets of the rod and farther from the end of the rod held in the fisherman's hand.

The fly rod and reel assembly is proportioned quite differently. On a fly rod, the mounting for the reel is located close to the end of the pole where it would be held if it was a general-purpose rod. In fact, the fly rod is actually held by the fisherman in a different way than the general-purpose rod. When using a fly rod, the rod is gripped above the reel, the hand of the fisherman being placed between the reel and the rod eyelets. Consequently, the handle end of the fly rod does not extend very far past the mounted fly rod. Essentially, the reel of a fly rod is mounted nearly at the end of the rod, while the general-purpose rod has its reel mounted about one third of the way up the rod towards the eyelets.

The prior art rod holders are constructed so that the end of the rod most proximate to the reel is inserted into the holder. These holders are usually tubular in construction, a configuration most suitable for holding cylindrical fishing rods. This sort of holder will not work when used with a fly rod. As noted above, the fly rod has little to no handle extending below the reel. Hence, the prior art rod holder simply will not work satisfactorily with a fly rod. Furthermore, the idea of inserting the rod into a holder to take some weight off the fisherman does not work for fly fishing rods. Indeed, once the rod is in its holder, it becomes practically immobile, which is hardly compatible with a fishing style that involves repeated casts.

In order to reduce the weight of the fishing rod the prior art shows attempts for temporarily removing the fishing reel from the fishing rod. For example, U.S. Pat. No. 3,556,365, George Nulan inventor, issued Jan. 19, 1971, discloses a spinning reel transfer mechanism in which a mechanical holder for spinning reel is supported on a frame shaped to fit the contour of the fisherman's body and is attached to a belt for being buckled around the body of the fisherman. From a lower end of the support frame, there is a belt which is disposed for being connected with the belt at the rear of the person wearing it. It does provide means by which a reel is placed on an extension to the mechanical holder leaving the rod free in one hand to facilitate casting.

Although offering the advantage of reducing the overall weight of the fishing rod, the invention disclosed in the hereinabove mentioned patent, suffers from numerous drawbacks. One of the main disadvantages associated with this invention resides in that only the reel is separable from the rod. The intended user thus needs a reel seat which remains attached to the rod and a second reel seat attached to the belt. The intended user must therefore attach the reel to either one of the reel seats. This operation may be both tedious and time consuming.

U.S. Pat. Nos. 828,557, 1,013,333 and 2,018,923 describe mechanisms that allow the fishing rod to slide outside their handles. The purpose of U.S. Pat. Nos. 828,557 and 1,013,333 is to inverse the rod handle. U.S. Pat. No. 828,557 describes a mechanism to modify the reel position in such a way that the fishing rod may be used for fly fishing as well as bait casting. Accessorily, the mechanism allows to modify the rod length by sliding a part of the rod inside one or the other end of the handle. The fisherman can thus vary his rod length according to his fishing activities, i.e. fly fishing or bait casting. U.S. Pat. No. 1,013,333 describes a reversible handle removable from the rod shaft for positioning the reel either above or below the hand-piece. U.S. Pat. No. 2,018,923 also describes a handle which can be removed from the fishing rod shaft to insert, inside the latter, a mechanism allowing a variable stiffness of the rod movement. In the three above precited patents, the detachable handle system is based on pressure exerted on the interior of the handle by knobs, bushings, and/or sockets mounted on the rod shaft. They concern a detachable handle on which the reel seat is fixedly mounted. However, none of them allows to detach only the reel to remove weight from the rod while keeping a functional rod. For all the prior art, once the reel is detached from the rod shaft, the fishing rod is not functional anymore since the handle is removed. It should be desirable to have a fishing rod where once the reel is removed, the fishing rod is still functional.

Marshall (Marshall, M., How to Make Your Own Fishing Rods. New York: Book Division, Times Mirror Magazines Inc., 1978) and Pfeiffer (Pfeiffer, C. B., Tackle Care: The Tackle Maintenance Handbook. New York: Nick Lyons Books. 1987) describe how to install or replace a reel holder behind a rod handle. Marshall describes how to make a fishing rod. To mount a reel seat behind a handle, bushings and adhesive are used. Pfeiffer describes how to replace reel seats. Similarly, he suggests to use bushing material and adhesive to make a tight connection. The method described by both authors requires dexterity and tools and is long to proceed. Moreover, using bushings and adhesive make the reel seat permanently locked to the rod shaft.

For fly fishing, practice has shown that reels play a secondary role in the casting and the retrieval of the lure since, between each cast, the line that has been cast does not have to be rewound onto the reel. Moreover, the reel, including the part of the line that stays on the reel after a cast (often 30% to 50% of the line's entire length) is the heaviest part of the rod. The reel can easily be three times heavier than a rod of the highest quality. Thus, fastening and unfastening the reel should be easy, such as with a simple locking mechanism, since this movement could be repeated several times.

Accordingly, there exists a need for an improved fly fishing rod having a detachable reel and reel seat assembly, a reel seat holding device, and a waist holder therefore.

SUMMARY OF THE INVENTION

It is an aspect of the present invention to enable the fisherman to cast with the lightest possible fishing rod.

Another aspect of the present invention is to provide a detachable reel seat which can be easily fastened to and unfastened from a conventional fly fishing rod through a set of simple ergonomic steps without requiring special tooling or manual dexterity. The attachment and detachment to and from the fly fishing rod should be accomplished quickly even in harsh environment when manual skills are lessened by cold, humidity or the like.

Another aspect of the present invention is to allow the fisherman to detach, at any time, the reel and reel seat assembly of the fishing rod while keeping a functional fishing rod.

It is another aspect of the present invention to provide an associated waist holder specifically adapted to receive the reel and reel seat assembly. The holder should be specifically designed to ergonomically position the reel and reel seat assembly: on the right side for a right-handed person while on the left side for a left-handed person. It is also provided with a line positioning means, a guiding eyelet, which further increases ergonometric of the casting procedure.

The above and other objects may be achieved by providing a fly fishing rod including a handgrip and adapted for removably connecting a reel to the handgrip by means of a hollow cylindrical reel seat. The fly fishing rod also comprising a rod shaft. The handgrip is disposed at an inner end of the rod shaft which has a portion extending past the handgrip so as to mount the reel thereon through the reel seat, rearwardly of the handgrip. The fly fishing rod comprises a sleeve like adapter engaged over the shaft portion. The adapter is formed with an engaging locking means. The reel seat is slidable over the adapter and formed with an engageable member arranged to be engaged by the engaging locking means for connecting the reel seat to the handgrip, and to be removed therefrom by disengaging the engageable member from the engaging locking means, thereby making it possible to dispose the reel seat away from the fly fishing rod.

According to a general aspect, there is provided a fly fishing rod comprising a fishing rod shaft having a tip end and a proximal end, a handgrip mounted to the fishing rod shaft, a sleeve like adapter, a hollow cylinder, and a reel with a fishing line. The handgrip is proximate to the proximal end of the fishing rod shaft and circumscribes the rod shaft. The handgrip has a length ll adapted for receiving a fisherman's hand thereon and has an external diameter along at least a portion of the length l1 thereof which is greater than an external diameter of the fishing rod shaft. The fishing rod shaft has a proximal portion extending past the handgrip towards the proximal end. The sleeve like adapter is secured over the proximal portion and is formed with an engaging locking means. The sleeve like adapter has an outer face with a diameter d1 at a first end, proximate to the proximal end of the fishing rod shaft. The hollow cylinder has a peripheral wall with an outer face and an inner face opposed to the outer face and defining a cavity. The outer face includes a reel seat with fasteners. The cavity has a diameter d2 wider than the diameter d1 allowing the adapter to be slidably inserted into the cavity by first inserting the first end of the adapter. The hollow cylinder has an engageable member engageable with the engaging locking means when sliding the hollow cylinder over the adapter. The hollow cylinder is releasably secured to the adapter by inducing less than a 360 degree rotation of the hollow cylinder relatively to the adapter. The reel is mounted to the outer face and over the cavity of the hollow cylinder, the hollow cylinder being removable from the adapter as a single unit with the reel mounted to the reel seat by disengaging the engageable member from the engaging locking means, thereby allowing the reel and the hollow cylinder to be mounted to and dismounted from the adapter secured over the fishing rod shaft.

According to another general aspect, there is provided a fly fishing rod with a detachable reel seat. The fly fishing rod comprises: a fishing rod shaft having a tip end and a proximal end; a handgrip monted to and circumscribing the fishing rod shaft, near the proximal end of the fishing rod shaft, the handgrip having a length l1 adapted for receiving a fisherman's hand thereon, the handgrip having an external diameter along at least a portion of the length l1 thereof which is greater than an external diameter of the fishing rod shaft, the fishing rod shaft having a proximal portion between the proximal end and the handgrip; a sleeve secured to the proximal portion, the sleeve having a generally cylindrical outer surface; a removable reel seat member defining a cylindrical cavity adapted to slide onto the outer surface of the sleeve into a mounted position, the reel seat member having reel fasteners; a reel mounted both to the removable reel seat with the reel fasteners and over the cavity of the removable reel seat; and a locking member associated with the reel seat member and the sleeve for releasably locking the reel seat member to the sleeve by inducing less than a 360 degree rotation of the reel seat relatively to the sleeve; whereby the reel and reel seat member can be released and removed from the fishing rod during the sport of fly fishing.

BRIEF DESCRIPTION OF THE DRAWINGS

The present invention will now be disclosed, by way of examples, in reference to the following drawings, in which.

DESCRIPTION OF THE PREFERRED EMBODIMENTS

Figure 1A:
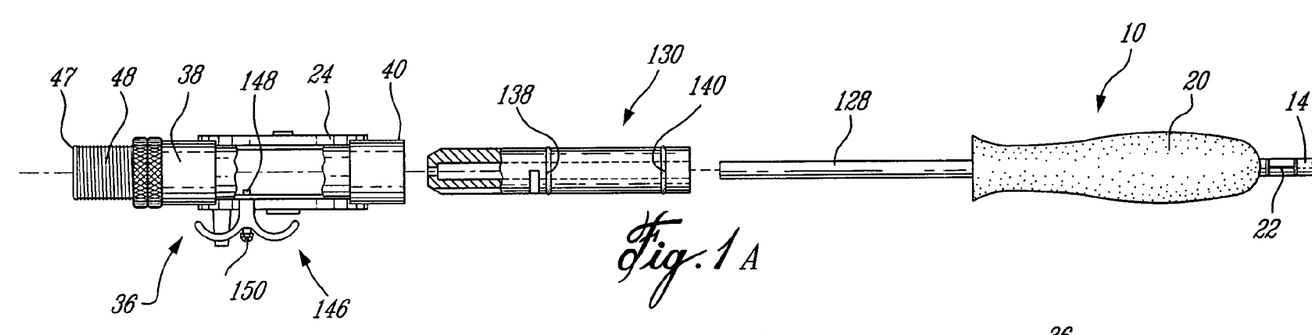
FIG. 1A is an exploded side view of a portion of a fly fishing rod wherein a detachable reel and reel seat assembly is unfastened therefrom and a cross-section view of a sleeve like adapter and cylindrical reel seat base.
Figure 1B:
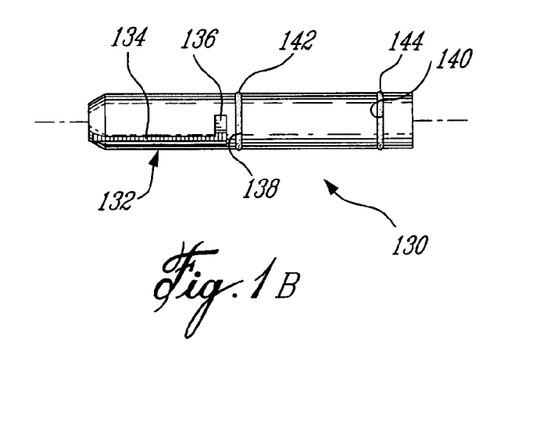
FIG. 1B is a side view of a sleeve like adapter.

Referring to FIG. 1A, a fly fishing rod 10 in accordance with an embodiment of the present invention is shown. Fishing rod 10 is preferably of the fly fishing type and includes an elongated rod shaft 14 but only a butt section thereof is shown on FIG. 1.

Typically, although by no means exclusively, rod shaft 14 includes a tip section attached in a releasable manner to the butt section by a male/female ferrule combination as it is well known in the art. The proximal end of the butt section part of rod shaft 14 is attached to a usual cylindrical handgrip 20. A keeper ring 22 is preferably mounted to rod shaft 14, adjacent to handgrip 20.

Figure 1C:
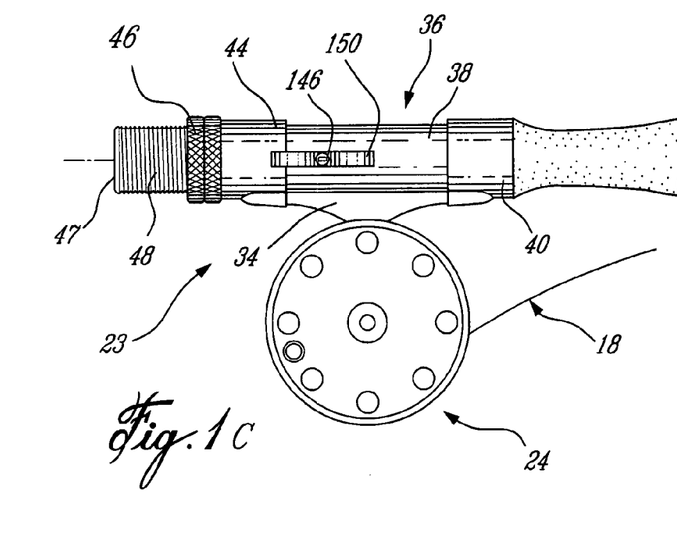
FIG. 1C is a side view of a reel and reel seat assembly mounted on a fly fishing rod.

Fishing rod 10 also includes a reel and reel seat assembly 23. Referring to FIG. 1C, it will be seen that reel and reel seat assembly 23 comprises a conventional fly reel 24 for winding a fly line 18 and a reel seat 36. Fly reel 24 includes a mounting foot 34 extending radially therefrom. Mounting foot 34 is adapted to be mounted to reel seat 36 in abutment contact with a cylindrical reel seat base 38. This base has a butt cap 47 at its proximal end and is open at its distal end 40.

Mounting foot 34 is adapted to be maintained in a predetermined relationship relative to reel seat base 38 by frictional contact with two rings 40, 44 and a screw locking nut 46 threadably mounted on the threaded proximal end 48 of reel seat base 38.

The fishing rod so far described is somewhat similar to conventional fly fishing rods and modifications to the standard components may be made without departing from the scope of the present invention.

One of the main feature of the present invention resides in that reel and reel seat assembly 23 is fastened to handgrip 20 in a releasable manner.

Referring back to FIG. 1A, it will be seen that rod shaft 14 has a portion 128 extending past handgrip 20 to mount a conventional fly reel 24 thereon through a reel seat 36, rewardly of handgrip 20. A sleeve like adapter 130 is fixedly engaged over portion 128, and the means by which this can be achieved will now be described. More particularly, referring to FIG. 1B, on the outer face of sleeve like adapter 130, there is provided a locking groove 132 shaped to engage a locking member as will be described later. Locking groove 132 has a longitudinal portion 134 followed by a transversal portion 136 that can receive therein the above mentioned locking member. Sleeve like adapter 130 also comprises two circumferential grooves 138, 140 wherein two adherence devices 142, 144 are inserted for adherence purpose.

Referring back to FIG. 1A, it will be seen that reel seat 36 has a hollow cylindrical shape and comprises a locking member and a handle 146. The engageable member is a stud 148 disposed inwardly of reel seat 36 as shown. Handle 146 is wing shaped and has a screw portion 150 for mounting it on reel seat 36. The tip of screw portion 150 constitutes stud 148 as the engageable member which is engaged inside locking groove 132 of sleeve like adapter 130.

For fastening reel 24 and reel seat 26 to rod shaft 14, sleeve like adapter 130 is slid inside hollow portion of reel seat 36 in such manner that the screw portion 150 is engaged in locking groove 132. Reel seat 36 is slid over sleeve like adapter 130 in such manner that stud 148 advances through longitudinal portion 134 until reaching transversal portion 136. Then, real seat 36 is rotated to cause stud 148 to engage transversal portion 136 thereby locking reel seat 36 to sleeve like adapter 130. Handle 146 facilitates the rotation movement of reel seat 36 for locking and unlocking reel seat 36 to sleeve like adapter 130 and may also be used merely to handle the reel 24 and reel seat 36. Referring to FIG. 1C, it will be seen that when reel seat 36 is mounted on fishing rod 10, handle 146 is laterally positioned relatively to fishing rod 10. Removing reel seat 36 from fishing rod 10 reduces the fishing rod weight. Once reel seat 36 is removed, fishing rod 10 is still functional.

Figures 2A, 2B:
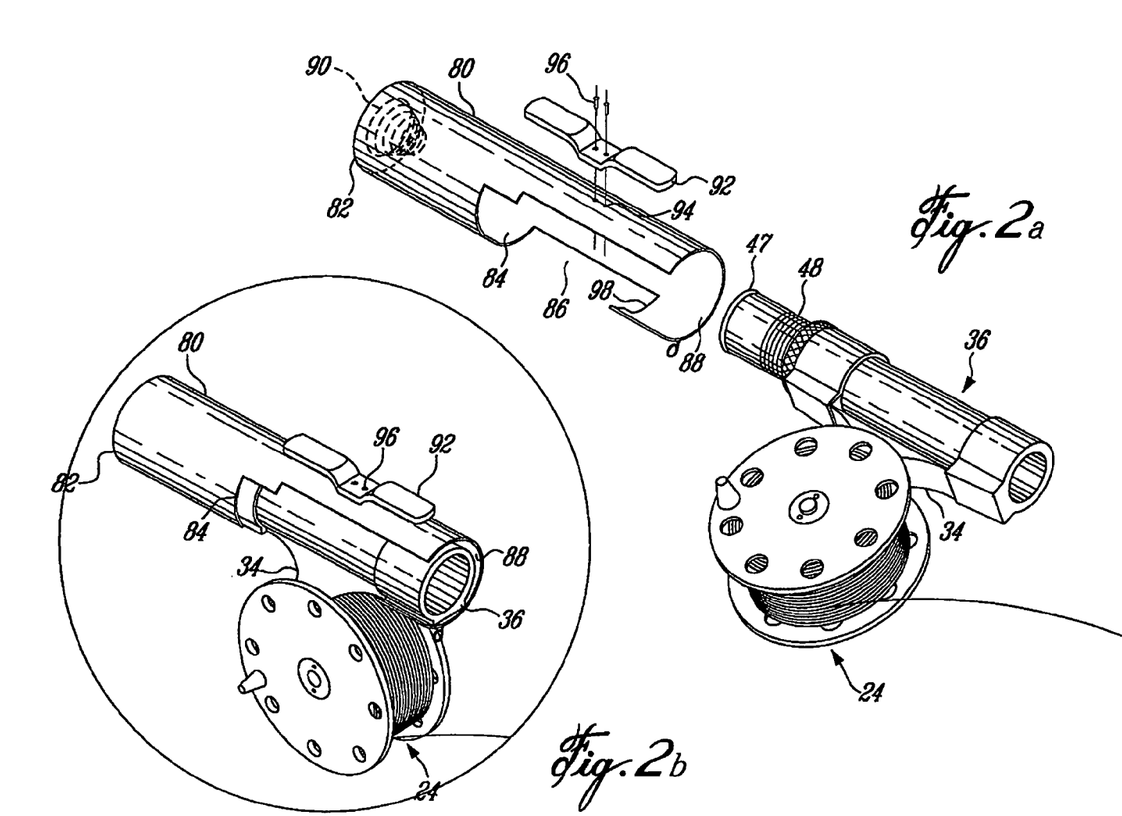
FIG. 2a is a perspective view illustrating a sleeve-like adapter having a reel mounted thereto and a cylinder with an opening, which runs from its top down along one side, and adapted for receiving the sleeve-like adapter therein, the sleeve-like adapter being shown before being inserted in the opening of the cylinder
FIG. 2b is a perspective view of the sleeve-like adapter after the adapter has been inserted in the opening of the cylinder.

FIG. 2 presents a second embodiment of the present invention which is a device for holding an additional reel seat 36 that accompanies any conventional fly fishing rod 10.

The device comprises a hollow cylinder 80 that is preferably made of metal or plastic. Cylinder 80 is closed at its proximal end 82 and open at its distal end 88. Cylinder 80 also has a partial opening 84 on one of its side and a lower part opening 86.

Inside cylinder 80, at closed proximal end 82, is a coil spring 90 in the form of a cone. In the middle of the topside of cylinder 80, a mounting foot 92 is attached in two holes 94, preferably with rivets or bolts 96. This mounting foot 92 is used to mount cylinder 80 to reel seat 36 of fly fishing rod 10. Mounting foot 92 is somewhat similar in its form, and wholly identical in its function, to mounting foot 34 used to mount reel 24 to reel seat 36.

The purpose of cylinder 80 is to mount reel and real seat assembly 23 in such a way that it is easily removed. For mounting reel and reel seat assembly 23, reel. 24 is pivoted laterally about 90 degrees upward (as illustrated in the main drawing of FIG. 2) in such way as it will fit into side opening 84 of cylinder 80. Then, proximal end 48 of reel seat 36 is inserted into open distal end 88 of cylinder 80 and slid toward closed end 82 until reaching lower opening 86, compressing coil spring 90 located on closed proximal end 82 of cylinder 80. Reel 24 is then returned to its usual vertical position by pivoting inside lower opening 86 of cylinder 80, while making sure that mounting foot 34 of reel 24 is inserted into a narrow groove 98 located above lower opening 86, closer to open distal end 88. The pressure exerted by compressed spring 90 on mounting foot 34 holds reel seat 36 and reel 24 firmly inside cylinder 80.

Figure 3:
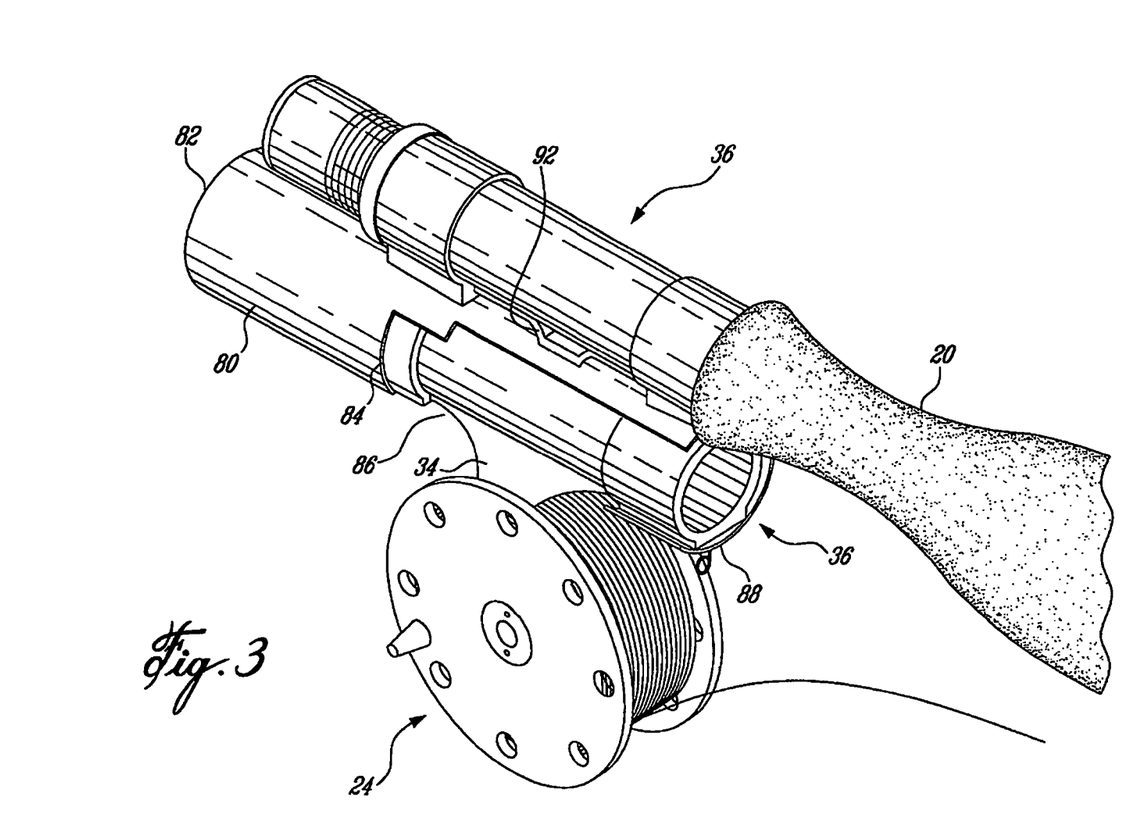
FIG. 3 is a perspective view illustrating the sleeve-like adapter and the cylinder shown in FIGS. 2a and 2b once installed in place, behind the handgrip and on the original reel seat of the rod, where the reel is normally attached.

The drawing on the lower left side of FIG. 2 illustrates the final position of reel and reel seat assembly 23 in cylinder 80. FIG. 3 shows reel and reel seat assembly 23 inside cylinder 80 and mounted to a conventional handgrip rod 20 and ready to be used.

The fisherman can thus fish with a reel and reel seat assembly 23 which, whenever he chooses, can be detached from handgrip 10 and held on a support at his waist. To detach reel and reel seat assembly from cylinder 80, the opposite of the operation described above is performed:

a) pushing reel seat 36 towards closed end 82 of cylinder 80 to compress spring 90,     b) releasing mounting foot 34 from groove 98,     c) pivoting reel 24 sideways, and     d) sliding reel and reel seat assembly 36 outside cylinder 80.

Figures 4A, 4B:
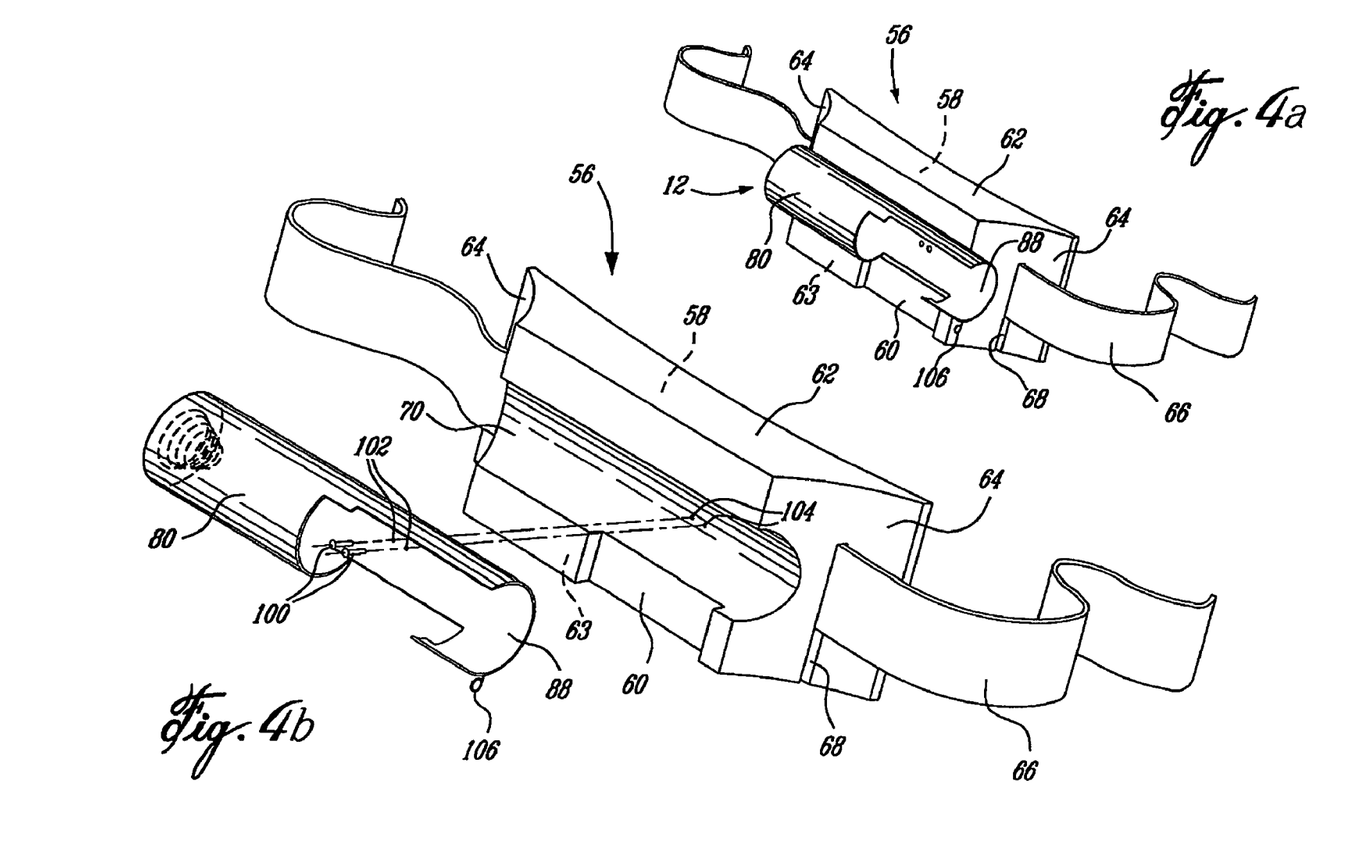
FIG. 4a is a perspective view illustrating a waist holder of the present invention with the cylinder shown in FIGS. 2a, 2b and 3 mounted thereto to hold the additional reel seat on a conventional rod
FIG. 4b is an exploded perspective view, of the waist holder and the cylinder.

FIG. 4 shows a waist holder 12 mounted to the fisherman's belt 66 (on the same side that he holds his fishing rod). Holder 12 includes a holder base 56 made preferably of plastic or light metal. Holder base 56 has a base inner surface 58, a base outer surface 60, a pair of opposed base lateral surfaces 64 and a pair of opposed base superior and inferior end surfaces 62, 63. Base inner surface 58 preferably has an arcuate configuration about its longitudinal axis in a manner to substantially conform to the configuration of the fisherman's waist contour.

Approximately half the distance between base inner 58 and outer surfaces 60 is a slot 68, approximately 2 mm wide, opened on base inferior surface 63, running the length of base 56 and following a curve identical to the curve of inner surface 58 of base 56. The fisherman slides his belt 66 into slot 68 along the entire length of base 56. Even though belt 66 is held tightly in slot 68, waist holder 12 remains horizontally mobile and can still be removed by the fisherman for convenience or security reasons.

On outer surface 60 of base 56 is a groove 70 in the form of a semi-circle running across the entire length of base 56. In groove 70 is set cylinder 80. Cylinder 80 is mounted to outer surface 60 of base 56 of waist holder 12 by two bolts or rivets 100, inserted in bottom partition 104 of groove 70 through two holes 102 in cylinder 80. Once mounted to base 56, the front end 88 of cylinder 80 runs about one centimetre past the edge of holder base 56 in such way that the fisherman can easily insert reel seat 36 into cylinder 80. On the inferior part of front end 88 a laterally open eyelet 106 guides fishing line 18 from waist holder 12 to rod 10.

Cylinder 80 allows the fisherman to insert reel and reel seat assembly 23 from his fishing rod 10 onto waist holder 12, and then to detach them, following the procedure described above. Waist holder 12 is designed to hold either detachable reel and reel seat assembly 23 such as in FIG. 1 or movable reel and reel seat assembly 23 shown in FIGS. 2 and 3. It can thus be adapted to the two embodiments of the present invention.

Waist holder 12 is configured, sized and positioned so that fly line 18 is substantially in line with handle 20 of rod 10 and the latter is in its frontal casting position substantially horizontal and proximate to the waist of the intended user. Also the width of the holder base makes it well visible and easy to handle by the angler.

Figure 5A:
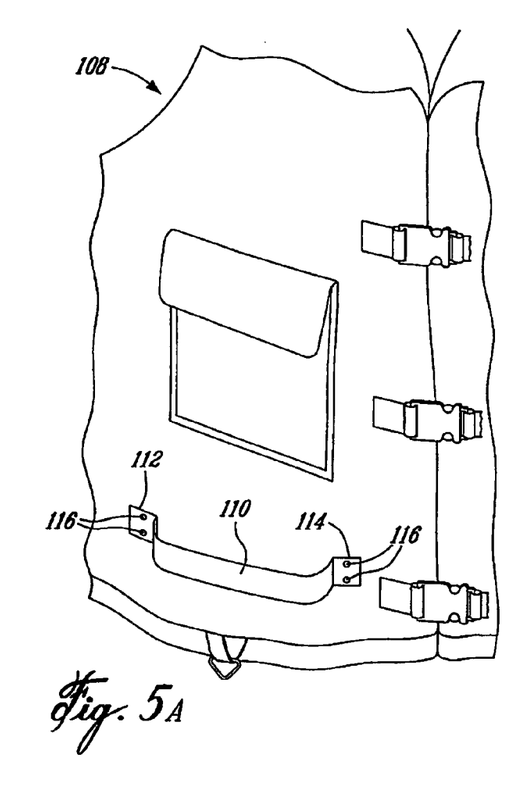
FIG. 5a is a perspective view illustrating a fishing vest or life jacket with a band.
Figure 5B:
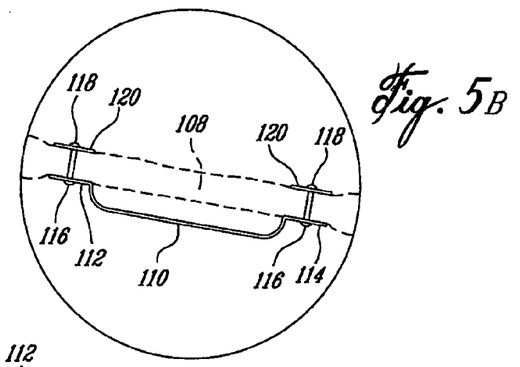
FIG. 5b is a cross-section view of the fishing vest or life jacket with the band.
Figure 5C:
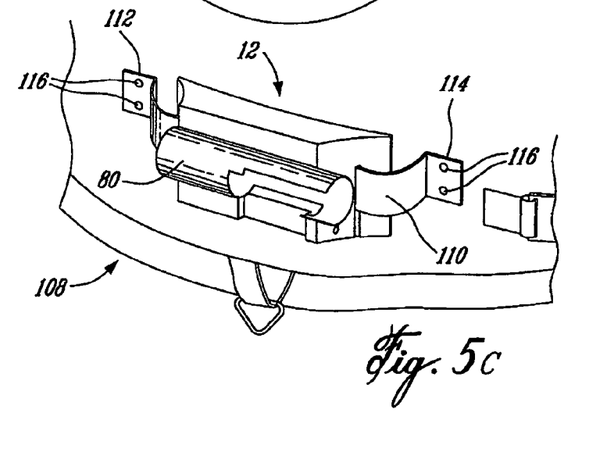
FIG. 5c is a perspective view of the fishing vest or life jacket with the band having the waist holder and the cylinder shown in FIGS. 4a and 4b mounted thereto, close to the fisherman's waist.

FIG. 5 illustrates a device allowing waist holder 12 to be worn on the side of a fisherman's life jacket 108.

A rigid band 110, preferably made of plastic or metal, about as wide as a belt and only slightly longer than waist holder 12 itself, can be attached to a life jacket 108. The central portion of band 110 is slightly curved on its longitudinal axis so that it can be inserted into slot 68 of waist holder 12. At each end 112, 114 of this curved portion, the band is flat and extends about three centimetres in an axis parallel to fishing jacket 108.

Ends 112, 114 of band 110 are mounted to jacket 108 with four bolts 116 crossing ends 112, 114 and the jacket material. On the interior face of jacket 108, nuts 118 tighten bolts 116. Nuts 118 are supported against the interior face of vest 108 on two small plates 120, each 6-cm by 6-cm, and made of the same rigid materials as band 110 itself.

Once rigid band 110 is attached, the fisherman can install waist holder 12 on it. Thereafter, he can insert reel and reel seat assembly 23 from rod 10 into waist holder 12.

An identical band device can also be installed in the same way on the cloth-type vest worn by fishermen.

I claim:

1. A fly fishing rod with a detachable reel seat, the fly fishing rod comprising:
   a fishing rod shaft having a tip end and a proximal end;
   a handgrip mounted to and circumscribing the fishing rod shaft, near the proximal end of the fishing rod shaft, the handgrip having a length l1 adapted for receiving a fisherman's hand thereon, the handgrip having an external diameter along at least a portion of the length l1 thereof which is greater than an external diameter of the fishing rod shaft, the fishing rod shaft having a proximal portion between the proximal end and the handgrip;
   a sleeve secured to the proximal portion, the sleeve having a generally cylindrical outer surface;
   a removable reel seat member defining a cylindrical cavity adapted to slide onto the outer surface of the sleeve into a mounted position, the reel seat member having reel fasteners;
   a reel mounted both to the removable reel seat with the reel fasteners and over the cavity of the removable reel seat; and
   a locking member associated with the reel seat member and the sleeve for releasably locking the reel seat member to the sleeve by inducing less than a 360 degree rotation of the reel seat relatively to the sleeve;
   whereby the reel and reel seat member can be released and removed from the fishing rod during the sport of fly fishing.

2. A fly fishing rod as claimed in claim 1, wherein the looking member comprises a male member and a corresponding female member, engageable with the male member, the male member being associated with one of the reel seat member and the sleeve, the female member being associated with the other one of the reel seat member and the sleeve.

3. A fly fishing rod as claimed in claim 2, wherein the male member comprises a stud and the female member comprises a groove shaped to receive the stud.

4. A fly fishing rod as claimed in claim 3, wherein the stud extends inwardly in the cylindrical cavity of the reel seat member.

5. A fly fishing rod as claimed in claim 3, wherein the groove is defined in the outer surface of the sleeve, the groove having an L-shape with a longitudinal portion followed by a transversal portion.

6. A fly fishing rod comprising a fishing rod shaft having a tip end and a proximal end; a handgrip mounted to the fishing rod shaft, proximate to the proximal end of said fishing rod shaft, the handgrip circumscribing the rod shaft and having a length l1 adapted for receiving a fisherman's hand thereon, the handgrip having an external diameter along at least a portion of the length l1 thereof which is greater than an external diameter of the fishing rod shaft, said fishing rod shaft having a proximal portion extending past said handgrip towards the proximal end;
   a sleeve like adapter secured over said proximal portion, said adapted being formed with an engaging locking means, the sleeve like adapted having an outer face with a diameter d1 at a first end, proximate to the proximal end of the fishing rod shaft;
   a hollow cylinder having a peripheral wall with an outer face and an inner face opposed to the outer face and defining a cavity, the outer face including a reel seat with fasteners, the cavity having a diameter d2 wider than the diameter d1 allowing said adapted to be slidably inserted into said cavity by first inserting the first end of said adapter, said hollow cylinder having an engageable member engageable with said engaging locking means when sliding the hollow cylinder over the adapter, said hollow cylinder being releasably secured to said adapter by inducing less than a 360 degree rotation of the hollow cylinder relatively to the adapter; and
   a reel, with a fishing line, mounted to the outer face and over the cavity of the hollow cylinder, the hollow cylinder being removable from the adapter as a single unit with the reel mounted to the reel seat by disengaging said engageable member from said engaging locking means, thereby allowing said reel and said hollow cylinder to be mounted to and dismounted from said adapter secured over said fishing rod shaft.

7. The fly fishing rod according to claim 6, wherein said engageable member comprises a stud extending inwardly from the inner face of the peripheral wall into the cavity of said hollow cylinder.

8. The fly fishing rod according to claim 7, wherein said engaging locking means of said adapter is in the form of a groove shaped to receive said stud.

9. The fly fishing rod according to claim 8, wherein said groove has an L-shape with a longitudinal portion followed by a transversal portion, so that when slidingly engaging said hollow cylinder over said sleeve like adapter said stud advances through said longitudinal portion until reaching said transversal portion when said hollow cylinder is rotated to cause said stud to engage said transversal portion thereby locking said hollow cylinder to said adapter, securing the hollow cylinder in a single predetermined position on the fishing rod shaft.

10. The fly fishing rod according to claim 9, wherein said transversal portion is adapted to lock said stud therein by friction means.

11. The fly fishing rod according to claim 6, wherein the hollow cylinder comprises handle means extending outwardly from the outer face for rotating the hollow cylinder for locking or unlocking the hollow cylinder to said adapter and manipulating it when removed from the fishing rod shaft.

12. The fly fishing rod according to claim 6, wherein the reel is removably securable to the outer face of the hollow cylinder, superposed to the cavity.

13. The fly fishing rod according to claim 1, wherein the adapter entirely covers the proximal portion and the proximal end of the fishing rod shaft.

* * * * *